(12) United States Patent
Eklind et al.

(10) Patent No.: US 6,374,164 B1
(45) Date of Patent: Apr. 16, 2002

(54) REMOTE CONTROL DEVICE FOR REMOTE OPERATION OF A MOTOR VEHICLE

(75) Inventors: Björn Eklind, Västra Frölunda; Olof Bane, Göteborg; Peter Ewerstrand, Hovås, all of (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/214,960
(22) PCT Filed: Jul. 15, 1997
(86) PCT No.: PCT/SE97/01275
§ 371 Date: Apr. 28, 1999
§ 102(e) Date: Apr. 28, 1999
(87) PCT Pub. No.: WO98/03949
PCT Pub. Date: Jan. 29, 1998

(30) Foreign Application Priority Data

Jul. 17, 1996 (SE) .............................. 9602796

(51) Int. Cl.⁷ .......................... G05D 1/00; G06F 17/00
(52) U.S. Cl. ................................. 701/2; 701/1
(58) Field of Search ................... 701/1, 2; 340/825.3, 340/825.31, 825.32, 825.33, 825.69, 825.72, 825.06, 539, 901, 902, 572.1; 307/10.1, 10.7; 446/456, 454, 455, 460; 455/517, 419, 564; 359/147, 100, 184

(56) References Cited

U.S. PATENT DOCUMENTS

| 4,680,790 A | | 7/1987 | Packard et al. ............. 379/432 |
|---|---|---|---|
| 4,788,542 A | * | 11/1988 | Tanabe .................... 340/825.31 |
| 4,866,764 A | | 9/1989 | Barker, III .................... 379/355 |
| 4,989,240 A | | 1/1991 | Fuse et al. .................... 379/355 |
| 5,146,215 A | * | 9/1992 | Drori ..................... 340/825.32 |
| 5,158,495 A | * | 10/1992 | Yonezawa .............. 340/825.32 |
| 5,220,319 A | | 6/1993 | Kendel .................. 340/825.69 |
| 5,307,048 A | * | 4/1994 | Sonders ....................... 340/426 |
| 5,543,776 A | * | 8/1996 | L'Esperance et al. ........ 340/426 |
| 5,583,479 A | * | 12/1996 | Hettich et al. ............... 340/426 |
| 5,749,547 A | * | 5/1998 | Young et al. .................... 246/4 |
| 5,803,789 A | * | 9/1998 | Dean et al. .................. 446/455 |
| 5,940,007 A | * | 8/1999 | Brinkmeyer et al. ... 340/825.69 |

FOREIGN PATENT DOCUMENTS

| DE | 42 34 542 A1 | 4/1994 |
| EP | 0 619 567 A1 | 10/1994 |
| FR | 2 597 537 | 10/1987 |
| WO | 91/14246 | 9/1991 |

* cited by examiner

Primary Examiner—Jacques H. Louis-Jacques
(74) Attorney, Agent, or Firm—Kilpatrick Stockton, LLP

(57) ABSTRACT

A remote control for wireless remote operation of different functions of a motor vehicle and consisting of a portable unit having a housing. In the housing, a plurality of control devices are arranged and are accessible through parts of the housing for manual operation for said control via a transmitter arranged in the housing. Each individual control device is arranged for controlling selected functions of the vehicle. The housing has a shape that is reminiscent of the shape of the vehicle to be remotely controlled. At least some of the control devices have a location in the housing and/or shape which gives associations to the function that is intended to be operated in the vehicle.

10 Claims, 2 Drawing Sheets

REMOTE CONTROL DEVICE FOR REMOTE OPERATION OF A MOTOR VEHICLE

Remote control for wireless remote operation of different functions of a motor vehicle and consisting of a portable unit having a housing in which a plurality of control devices are arranged and accessible through parts of the housing for manual operation for said control via a transmitter arranged in the housing, where each individual control device is arranged for controlling a selected function or functions of the vehicle.

TECHNICAL AREA

The invention relates to a remote control for wireless remote operation of different functions of a motor vehicle.

BACKGROUND OF THE INVENTION

From U.S. Pat. No. 5,220,319 is known a remote control for remote operation of different functions of a motor vehicle and is, more specifically, designed as a flat piece having three control devices in the shape of round pushbuttons. Information regarding the functions assigned to the different pushbuttons can be read from text on each button. The remote control, therefore, has to be taken out every time it is to be used and the text information has to be read in order to make it possible to activate the intended button. Although it would be possible for the user to learn the location of the buttons on the flat piece, the flat piece is completely round and has only one reference point in the shape of a keyring attachment, but the risk of pressing the wrong button is great. During periods of bad lighting, it can be difficult to read the text which, furthermore, has to be adapted to different language areas.

THE OBJECT OF THE INVENTION

It is an object of the present invention to eliminate the above described drawbacks and provide a remote control which both visually and tactilely will give a natural indication as to the function of the different control devices.

Said object is achieved by a remote control according to the invention, which is characterized in that the housing has a shape which associates to the function in the vehicle which is intended to be controlled.

SHORT DESCRIPTION OF THE DRAWINGS

Figure 1:
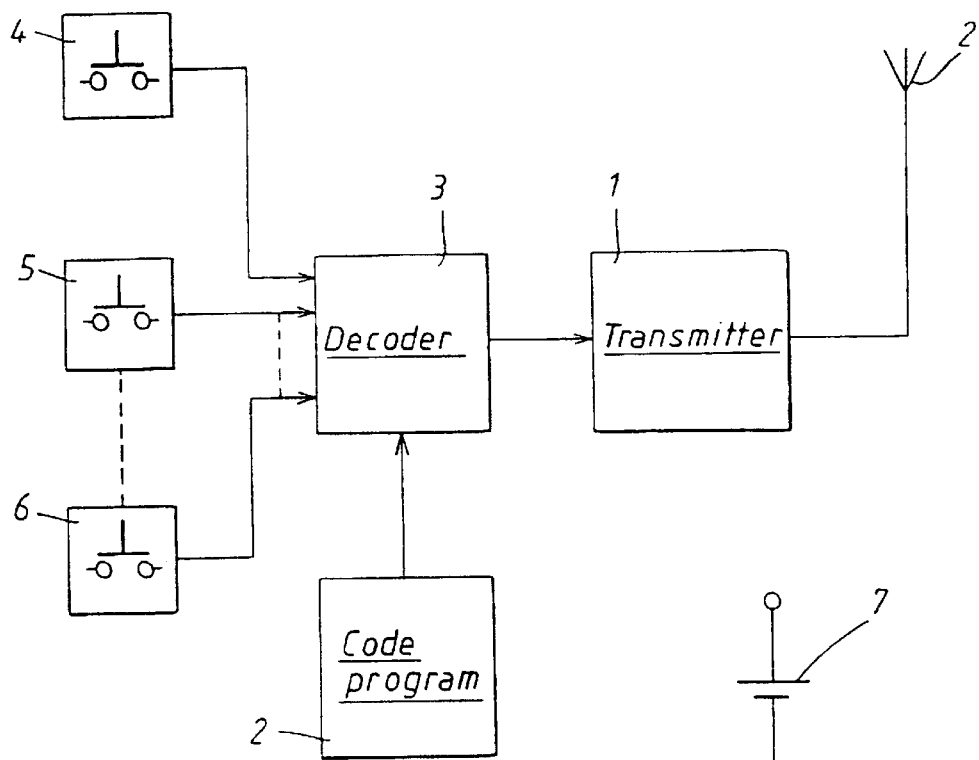
Figure 2:
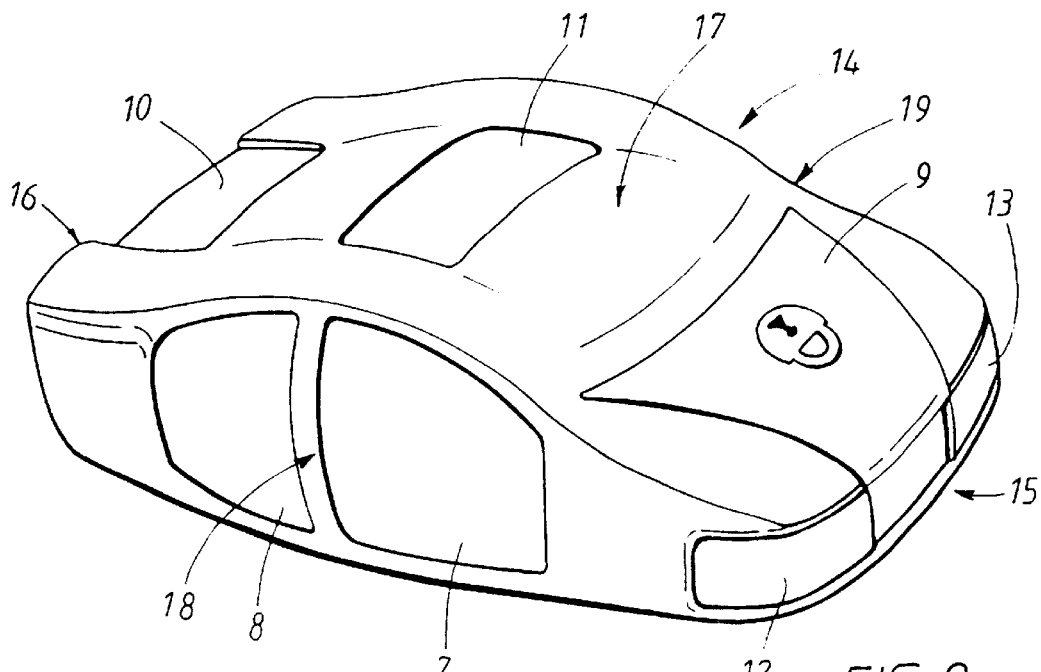
Figure 3:
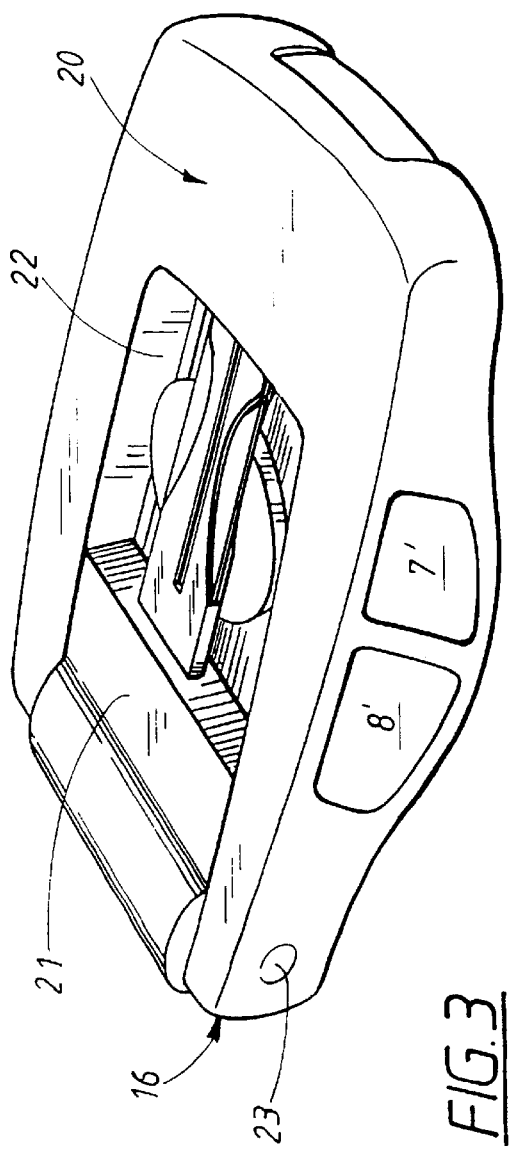
Figure 4:
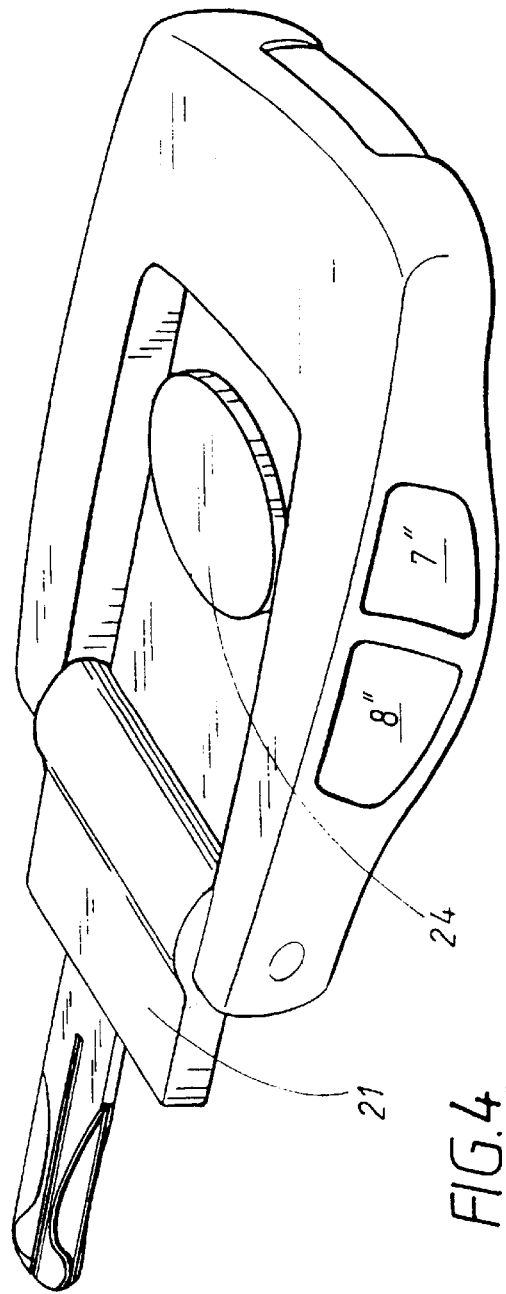

The invention will be described more in detail using an embodiment with reference to the attached drawings, on which FIG. 1. shows an example of a functional diagram of a remote control according to the invention, FIGS. 2, 3 and 4 show an example of the mechanical construction of a remote control according to the invention using different perspective views.

DESCRIPTION OF THE EMBODIMENTS

The remote control according to the invention is on the whole constructed as a transmitter of a control signal which is unique for the current vehicle, which in a conventional manner is provided with a receiver arranged to receive the unique control signal and to control different functions of the vehicle depending upon the information in the control signal. The different functions may be central locking for all doors, boot lid, sunroof, fueltank lid, bonnet etc. The doors, hatches etc. may also be controlled separately for locking and unlocking of only one door, hatch etc., when each locking and unlocking respectively suitably is combined with the activation and deactivation respectively of an alarm function which may be connected to, on the one hand, locks and on the other hand to other parts of the vehicle.

For wireless remote control of different functions of a vehicle, a radio signal is most commonly used as a control signal, so the remote control comprises a transmitter 1, which is arranged, when activated, to transmit an amplitude modulated or frequency modulated carrier signal as control signal via an antenna 2 built into the remote control. The control signal contains, on the one hand, information pertaining to a code which is unique for each specific vehicle and which constitutes the key to the vehicle and, on the other hand, a separate information which pertains to each control function in the form of a code. The individual, unique code is generated in a code programming unit 2, whilst a decoder 3 furthermore generates function codes which are activated by a plurality of switches 4, 5, 6, of which three are shown in the figure, this can vary from two switches and up. The energy required for operating the remote control and to produce the control signal is obtained from one or more batteries 7 built into the remote control.

The switches are suitably of the non-locking, spring-biased type of pushbuttons which, in the inactivated state assumes a stable rest position and when activated against the direction of the spring action are reset to an active position, for example closing a circuit. For this purpose, the remote control has a plurality of control devices in the shape of pushbuttons 7, 8, 7', 8', 9, 10, 11, 12, 13, which are arranged to shift the switches 4, 5, 6, as is shown in FIGS. 2, 3 and 4. The pushbuttons 7–13 are arranged in a housing 14 which encompasses the functions of the remote control according to FIG. 1 and which, according to the invention, is reminiscent of the shape of the vehicle which is to be controlled remotely, an automobile in the shown example. The housing 14 thus has a main shape which, not necessarily true to scale, is a representation of an automobile or the vehicle which the remote control is intended for, but still gives the impression of the main shape of, for example, an automobile because the housing 14 is formed having a front part 15, a rear part 16, a roof part 17, a right side part 18 and a left side part 19. The housing 14 can be regarded as consisting of a rigid shell, which corresponds to a vehicle body, whilst the pushbuttons fill openings or recesses in the shell and corresponds to hatches etc. in the body. At least some of the pushbuttons 7–13 have a location and, possibly, a shape such that they give an association to the functions of the vehicle which shall be operated. Thus, a plurality of pushbuttons 7, 8, 7', 8', 4 in the show example, are located in the right side part 18 and left side part 19 respectively with positions substantially corresponding to the right front and rear doors, respectively, and left front and rear doors, respectively, of the vehicle. In the most obvious case, pressing the button 7 at the right front door may mean activating the lock and alarm functions for the right front door of the vehicle etc. so that each door has its own individual activation. Activating the alarm and unlocking may, for example, be done individually for each door using a second depression of the corresponding pushbutton. A pushbutton 10 is located on the rear part 16 of the remote control positioned substantially corresponding to the boot lid of a vehicle and having a general shape which is reminiscent of a boot lid. This pushbutton 10 may be intended for locking and unlocking the boot lid of the vehicle and the corresponding switching of the alarm function.

In a similar manner, one of the pushbuttons 11 is located on top of the housing 14 of the remote control corresponding to the roof part 17 of the vehicle to be remotely controlled and in the shown example also having a shape which is reminiscent of a sunroof hatch of the vehicle. By depressing the pushbutton 11, the opening and closing of the sunroof hatch and its locking function may thus be operated.

In the front part 15 of the remote control, a pushbutton 9 is located in a manner which is reminiscent of a bonnet. Also the shape of the button is reminiscent of a bonnet and may be used for locking and unlocking the bonnet and also opening and closing of the same. Alternatively, this pushbutton 9 may be used as a common central locking function for locking all doors and hatches of the vehicle. The pushbuttons 12, 13 are located in the front part 15 of the vehicle and designed as headlamp symbols and may be used for lighting and extinguishing of these. Alternatively, the two pushbuttons may be connected with each other and form one continuous button.

FIGS. 3 and 4 show the bottom side 20 of the remote control, which thus corresponds to the bottom side of the vehicle. In the shown example, a mechanical key 21 is located on the bottom side, which in a conventional manner may be used for the mechanical locks of the vehicle, which should be present in the majority of cases in the event of an electric voltage failure. The key is set into a recessed part 22 of the bottom side of the remote control and flexibly connected to the rear part 16 of the vehicle via a rotation joint 23. As is apparent from FIG. 4, the key 21 is extendible to an employment position, at which the remote control serves as a gripping device having a grip-friendly design. In the shown example, a further pushbutton 24 is located in the recessed part 22. It may be used to activate a distress function for activation of an alarm, for example if the user discovers a theft of the vehicle or otherwise feels threatened. In a resting position, the key is located so that the pushbutton 24 is protected against unintentional activation.

To sum up, a natural indication is achieved according to the invention, without the necessity of informational text on the remote control or separate instructions, visually or tactilely, of the operating functions of the pushbuttons through the shape of the remote control and the location of the pushbuttons on the remote control owing to the association that is produced by the location and, possibly, the shape of the pushbuttons. For practical reasons, the pushbuttons may be given enlarged dimensions, with respect to the corresponding part of the vehicle, to facilitate activation. The pushbuttons are suitably made to protrude somewhat from the surface of the housing. The housing, furthermore, is not necessarily a true to life rendering of the shape of the vehicle, but may have a rounded, simplified design, which still gives the proper associations to the different functions.

The invention is not limited to the description above nor to the examples shown on the drawings, but can be varied within the scope of the appended claims. For example, it is not necessary that the pushbuttons are present for each four doors, but one single button may be present on one of the sides of the housing. The control signal may be supplemented by a returned receipt signal which is received by the remote control. The receipt may be indicated, for example, by flashing signals on the headlight symbols of the remote control. The control signal may be another air borne signal such as an infrared signal etc.

What is claimed is:

1. Remote control for wireless remote operation of different functions of a motor vehicle comprising:
   a portable unit having a housing in which a plurality of control devices are arranged and accessible through parts of said housing for manual operation of said remote control via a transmitter arranged in said housing, where each individual control device is arranged for controlling at least one selected function of said vehicle, further comprising:
   a housing having a shape that visually or tactilely is reminiscent of the shape of said vehicle to be remotely controlled,
   wherein at least one of said control devices has a location in said housing and shape which visually or tactilely gives associations to said function that is intended to be operated in said vehicle.

2. Remote control according to claim 1, wherein at least one of said control devices has a location that corresponds to a vehicle door, and
   further wherein said control device is intended to control a locking function of at least one door of said vehicle, said control device having a location corresponding to the location of said door.

3. Remote control according to claim 1, wherein one of said control devices has a location in said housing corresponding to a trunk lid and is arranged to control a locking function of said trunk lid.

4. Remote control according to claim 1, wherein one of said control devices has a location in said housing corresponding to the location of a sunroof hatch of said vehicle and its locking function.

5. Remote control according to claim 1, wherein one of said control devices is arranged to control all looking functions of said vehicle.

6. Remote control according to claim 1, wherein each said control device is arranged to control all locking functions of said vehicle through a second activation of any of said control devices.

7. Remote control according to claim 1, wherein at least one of said control devices is arranged to control the alarm functions of said vehicle.

8. Remote control according to claim 1, wherein at least one of said control devices is arranged for distress triggering of an alarm function.

9. Remote control according to claim 1, wherein at least one of said control devices is located on the bottom side of said housing.

10. Remote control according to claim 1, wherein said remote control is connected to a mechanical key for the mechanical locks of said vehicle and said key is adjustable between an extended employment position and a position set into a recessed part of said housing of said remote control.

* * * * *